(12) United States Patent
Eckhardt et al.

(10) Patent No.: US 10,215,655 B2
(45) Date of Patent: Feb. 26, 2019

(54) PRESSURE SENSOR ASSEMBLY

(71) Applicant: Honeywell International Inc., Morris Plains, NJ (US)

(72) Inventors: Todd Eckhardt, Westerville, OH (US); Lamar Floyd Ricks, Lewis Center, OH (US)

(73) Assignee: Honeywell International Inc., Morris Plains, NJ (US)

( * ) Notice: Subject to any disclaimer, the term of this patent is extended or adjusted under 35 U.S.C. 154(b) by 57 days.

(21) Appl. No.: 14/986,574

(22) Filed: Dec. 31, 2015

(65) Prior Publication Data

US 2017/0191895 A1 Jul. 6, 2017

(51) Int. Cl.
*G01L 19/14* (2006.01)
*G01L 19/00* (2006.01)
*G01L 19/06* (2006.01)

(52) U.S. Cl.
CPC ........ *G01L 19/147* (2013.01); *G01L 19/0038* (2013.01); *G01L 19/0092* (2013.01);
(Continued)

(58) Field of Classification Search
CPC . G01L 19/147; G01L 9/06; G01L 9/00; G01L 19/0007; G01L 19/0038;
(Continued)

(56) References Cited

U.S. PATENT DOCUMENTS

| | | | |
|---|---|---|---|
| 5,255,728 A | 10/1993 | Nojiri et al. | |
| 6,311,561 B1 * | 11/2001 | Bang | G01L 9/0073 73/708 |

(Continued)

FOREIGN PATENT DOCUMENTS

| | | |
|---|---|---|
| CN | 206583566 U | 10/2017 |
| EP | 2554965 A2 | 2/2013 |

(Continued)

OTHER PUBLICATIONS

China Patent Application No. 201621476457.0, Notification to Grant Patent Right, dated Jul. 7, 2017, 4 pages.

(Continued)

*Primary Examiner* — Jonathan Dunlap
*Assistant Examiner* — Octavia Hollington
(74) *Attorney, Agent, or Firm* — Seager, Tufte & Wickhem LLP

(57) ABSTRACT

A pressure sensor assembly having a sensor unit, a pressure port, and an electrical connector. The sensor unit may include a printed circuit board (PCB), a pressure sensor, a support, and a media isolation layer. The PCB may have a first side and an opposite second side, where the pressure sensor may be secured to the first side. The support may also be secured to the first side of the PCB and may circumferentially surround the pressure sensor and/or may define a media sensing opening. The media isolation layer (e.g., a gel or other material) may be provided in the media sensing opening and encase the pressure sensor, where the media isolation layer may transfer a pressure provided by the media in the pressure port to the pressure sensor and may act as a barrier between the media and the pressure sensor.

17 Claims, 8 Drawing Sheets

(52) U.S. Cl.
CPC ........ *G01L 19/0627* (2013.01); *G01L 19/142* (2013.01); *G01L 19/148* (2013.01)

(58) Field of Classification Search
CPC ............. G01L 19/0092; G01L 19/0627; G01L 19/142; G01L 19/148; H05K 3/30
USPC .......................................................... 73/756
See application file for complete search history.

(56) References Cited

U.S. PATENT DOCUMENTS

| | | | | |
|---|---|---|---|---|
| 6,408,697 | B1* | 6/2002 | Ootake | G01L 19/0038 73/706 |
| 6,813,953 | B2* | 11/2004 | Baba | G01L 19/0645 73/715 |
| 6,877,380 | B2 | 4/2005 | Lewis | |
| 6,923,069 | B1 | 8/2005 | Stewart | |
| 7,000,478 | B1* | 2/2006 | Zwollo | G01K 1/08 374/E1.011 |
| 7,024,937 | B2* | 4/2006 | James | G01L 19/003 73/756 |
| 7,082,835 | B2 | 8/2006 | Cook et al. | |
| 7,162,927 | B1* | 1/2007 | Selvan | G01L 19/0084 73/706 |
| 7,210,357 | B2* | 5/2007 | Tanaka | G01L 19/147 73/753 |
| 7,216,547 | B1 | 5/2007 | Stewart et al. | |
| 7,370,536 | B2* | 5/2008 | Ueyanagi | G01L 19/0084 73/715 |
| 7,426,868 | B2* | 9/2008 | Fessele | G01L 19/069 73/706 |
| 7,458,274 | B2 | 12/2008 | Lamb et al. | |
| 7,493,822 | B2 | 2/2009 | Stewart et al. | |
| 7,503,221 | B2 | 3/2009 | Wade | |
| 7,992,441 | B2* | 8/2011 | Mulligan | G01L 19/0627 73/706 |
| 8,215,176 | B2 | 7/2012 | Ding et al. | |
| 8,371,176 | B2* | 2/2013 | Rozgo | G01L 19/0007 73/727 |
| 8,459,125 | B2* | 6/2013 | Wade | G01L 19/148 73/753 |
| 8,468,895 | B2* | 6/2013 | Colombo | G01L 19/0038 73/715 |
| 8,817,483 | B2* | 8/2014 | Eckhardt | G01L 19/003 307/104 |
| 9,316,552 | B2* | 4/2016 | Wagner | G01L 9/0054 |
| 9,945,747 | B1* | 4/2018 | Kusanale | G01L 7/08 |
| 2003/0167851 | A1 | 9/2003 | Parker | |
| 2007/0095144 | A1 | 5/2007 | Oboodi et al. | |
| 2010/0064818 | A1 | 3/2010 | Shubert | |
| 2010/0180688 | A1 | 7/2010 | Khemet et al. | |
| 2015/0247776 | A1 | 9/2015 | Wagner et al. | |

FOREIGN PATENT DOCUMENTS

| | | |
|---|---|---|
| EP | 3187848 A1 | 7/2017 |
| WO | 2005088268 A1 | 9/2005 |
| WO | 2009153741 A1 | 12/2009 |

OTHER PUBLICATIONS

Europe Patent Application No. 16204555, Extended European Search Report, dated May 30, 2017, 10 pages.

* cited by examiner

PRESSURE SENSOR ASSEMBLY

TECHNICAL FIELD

The present disclosure relates generally to sensors, and more particularly to pressure sensor assembly structures.

BACKGROUND

Sensors are commonly used today to sense environmental parameters such as pressure, temperature, humidity, flow, thermal conductivity, gas concentration, light, magnetic fields, electric fields, as well as many other environmental parameters. Such sensors are used in a wide variety of applications including, for example, medical applications, flight control applications, industrial process applications, combustion control applications, weather monitoring applications, water metering applications, as well as many other applications.

SUMMARY

The present disclosure relates generally to sensors, and more particularly to pressure sensor assemblies. In one example, a pressure sensor assembly may include a sensor unit, a pressure port, and an electrical connector. The sensor unit may have a pressure input port on a first side of the sensor unit. Further, the sensor unit may include a printed circuit board (PCB), a pressure sensor including a pressure sense element, a support, and a media isolation layer. The PCB may have a first side and an opposite second side, where the pressure sensor may be secured to the first side of the PCB. The support may be secured to the first side of the PCB and may circumferentially surround the pressure sensor and/or may define a media sensing opening. The support may be a gel ring. In some cases, the support may include one or more apertures that are configured to receive one or more components other than the pressure sensor that are attached to the first side of the printed circuit board. The media isolation layer (e.g., a gel or other material) may be provided in the media sensing opening and encase the pressure sensor, where the media isolation layer may transfer a pressure provided by the media in the pressure port to the pressure sensor and may act as a barrier between the media and the pressure sensor.

In some instances, the pressure port may have an external side and an internal side and may define a fluid path extending between the external and internal sides. In some cases, the support may be secured to or secured relative to the internal side of the pressure port such that the fluid path of the pressure port may be in fluid communication with the media isolation layer in the media sensing opening. A seal may be situated between the support and the pressure port.

In some instances, the electrical connector may include a mechanical connector and one or more electrical terminals. In some cases, at least one of the multiple electrical terminals may be electrically connected to an output of the sensor unit.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
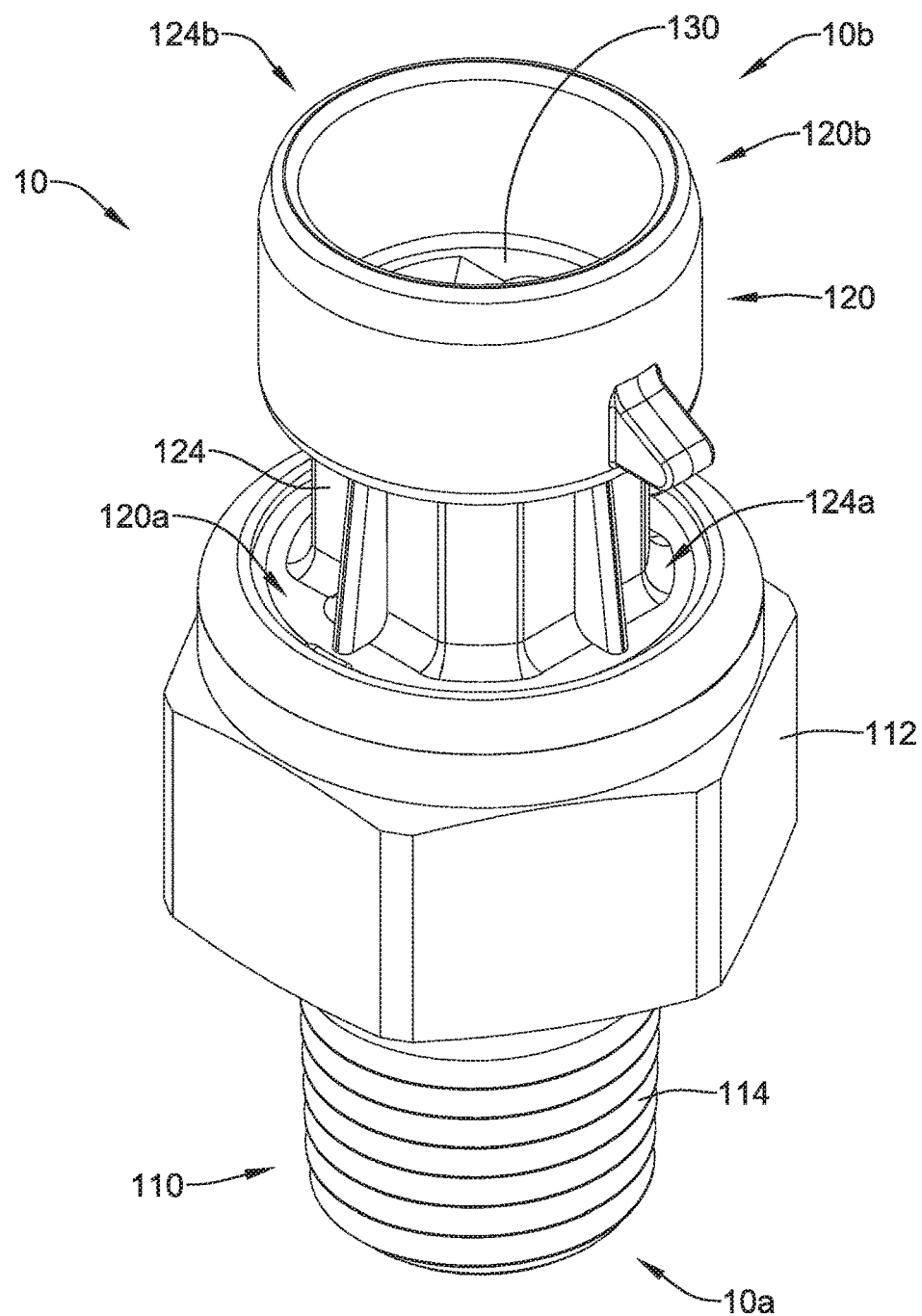
FIG. 1 is a schematic perspective view of an illustrative sensor assembly.

While the disclosure is amenable to various modifications and alternative forms, specifics thereof have been shown by way of example in the drawings and will be described in detail. It should be understood, however, that the intention is not to limit aspects of the disclosure to the particular embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative of the disclosure.

Referring to the Figures, and in one illustrative embodiment, a sensor assembly 10 may include a sensor unit 20 having a first side 20*a* and a second side 20*b*, a pressure port 110 on the first side 20*a* of the sensor unit 20, and an electrical connector 120 on the second side 20*b* of the sensor unit 20, as best depicted in FIGS. 1-6. In some instances, pressure port 110 may be mechanically connected to sensor unit 20. At a first end 120*a*, electrical connector 120 may be mechanically and electrically connected to sensor unit 20 and at a second end 120*b*, the electrical connector 120 may mechanically and electrically connect to a cable harness or other device (not shown) that is configured to receive an output of the sensor unit 20.

It is contemplated that sensor assembly 10 may be any suitable type of sensor assembly. For example, sensor assembly 10 may be a pressure sensor assembly, a humidity sensor assembly, a force sensor assembly, a pressure switch assembly, a light sensor assembly, a gas concentration sensor assembly, a magnetic or electrical field sensor assembly, a conductivity sensor assembly, or another other suitable sensor assembly.

Figure 2:
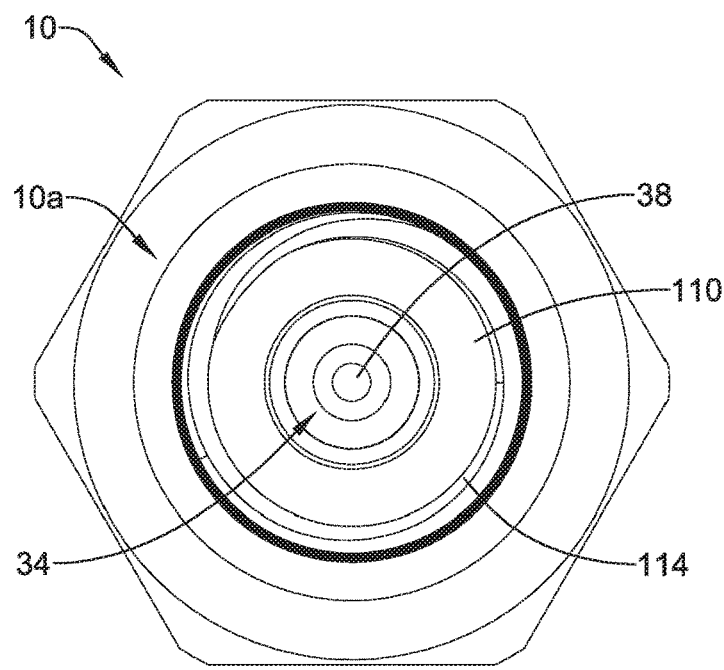
FIG. 2 is a schematic view of the illustrative sensor assembly of FIG. 1 viewed from a pressure port side of the sensor assembly.
Figure 3:
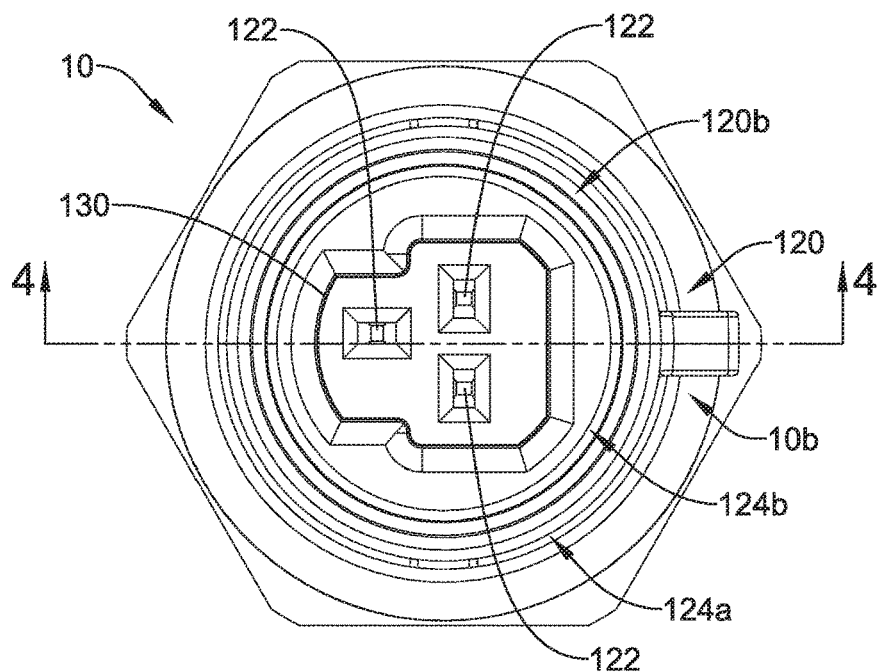
FIG. 3 is a schematic view of the illustrative sensor assembly of FIG. 1 viewed from an electrical connector side of the sensor assembly.

FIGS. 2 and 3 depict a first end 10*a* and a second end 10*b* of the sensor assembly 10. The first end 10*a* of the sensor assembly 10 may be configured to be mechanically connectable to a device having a media to be measured. The second end 10*b* of the sensor assembly 10 may be configured to be mechanically and electrically connected to a device configured to receive an output of the sensor unit 20.

Figure 4:
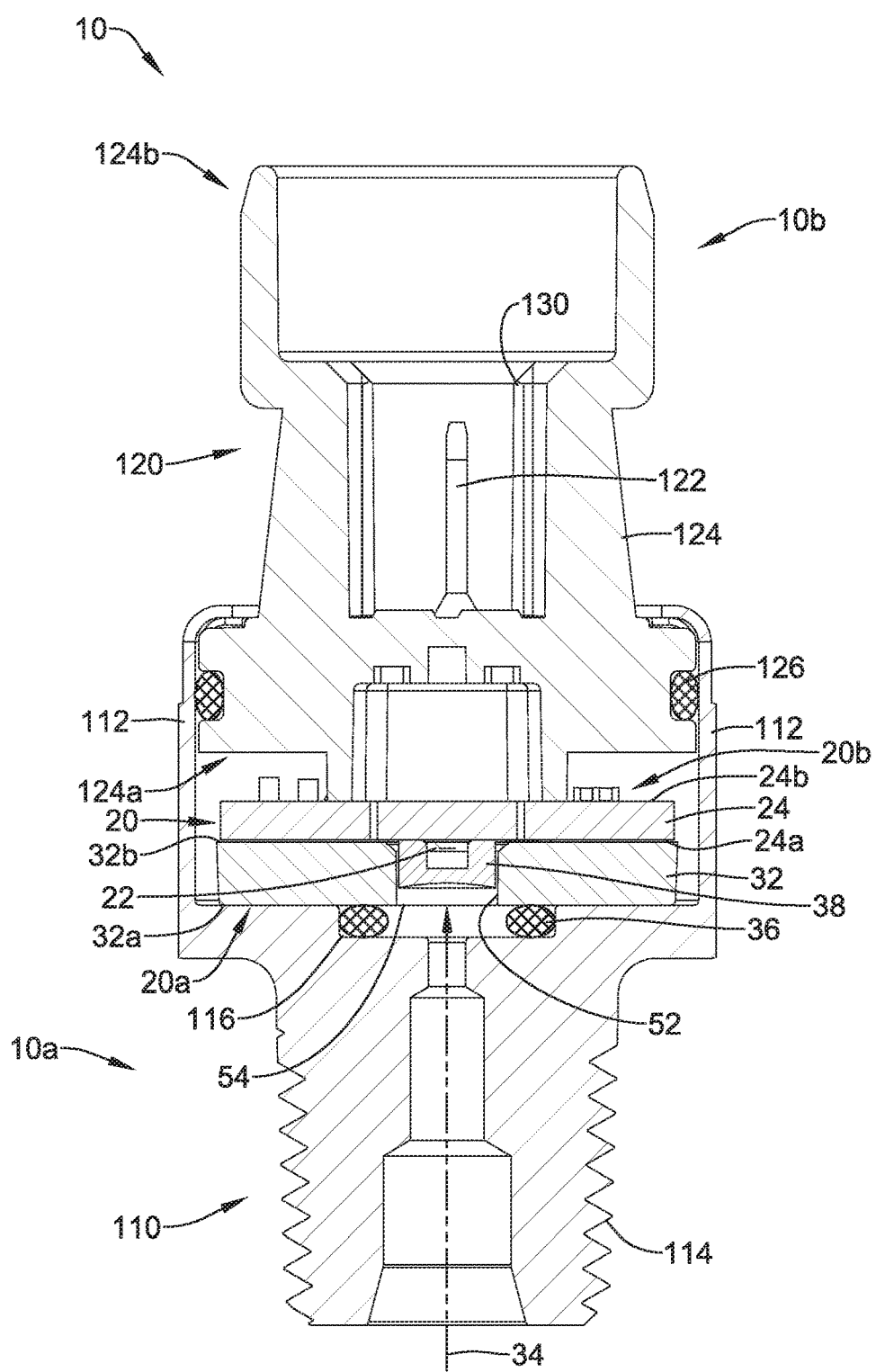
FIG. 4 is a schematic cross-sectional view of the illustrative sensor assembly of FIG. 1, taken along line 4-4 in FIG. 3.

As best shown in FIGS. 1, 2 and 4, the pressure port 110 of the sensory assembly 10 may at least partially define a fluid path 34 that extends from an external side of the pressure port 110 to an internal side of the pressure port (e.g. to a media isolation layer 38 of the sensor unit 20), where the media isolation layer may cover or encase the sensor 22 within a media isolation opening 52 (e.g., a media sensing opening) of a support 32 forming a pressure input port 54 of the sensor unit 20, as shown in FIG. 4 for example). In some cases, the pressure port 110 may include threads 114 and/or other connecting configuration for mechanically connecting the pressure port 110 and/or the sensor assembly 10 to one or more device having a fluid to be measured. Although pressure port 110 may be depicted as having a male-type connector, the pressure port may be configured with a female-type connector with threads or other connector configuration on an interior surface of the pressure port 110.

As best shown in FIGS. 1 and 3, the electrical connector 120 may have an electrical connector body 124 (e.g., a housing) with a first end 124a and a second end 124b, a mechanical connector 130, and one or more electrical terminals 122. In one example, one or more of the electrical terminals 122 may be exposed at first end 124a of electrical connector body 124 and one or more of the electrical terminals 122 may be exposed at second end 124b of electrical connector body 124.

FIG. 4 depicts a cross-section of the illustrative sensor assembly 10 taken along line 4-4 in FIG. 3. As shown in FIG. 4, the pressure port 110 may include walls 112 that extend around the sensor unit 20 and the first end 124a of the electrical connector body 124. Alternatively, or in addition, the sensor assembly 10 may include a walls and/or a housing separate from the pressure port 110 that may surround and/or mechanically connect to one or more of the electrical connector 120, the sensor unit 20, and the pressure port 110.

The pressure port 110 and/or the walls 112 may be made out of any material. For example, the pressure port 110 and/or the walls 112 may be made out of brass, aluminum, stainless steel, plastic or any other suitable material. In some cases, at least a portion of the pressure port 110 (e.g., a portion of the pressure port 110 that may be connected to a support 32 or other portion of the pressure port) may have a textured surface or non-textured surface, where the textured surface may facilitate adhering pressure port 110 to the support 32 and may be formed from one or more processes including, for example, an abrasive etch, grit blasting, a chemical etch, a laser etch, machining, and/or any other suitable texturing technique. In one example, the support 32 may be secured to or secured relative to an internal side of the pressure port 110 (e.g., to or relative to a shoulder or other portion of the internal side of the pressure port 110) such that the fluid path 34 of the pressure port 110 is in fluid communication with the media isolation layer 38.

The illustrative sensor unit 20 may rest against the pressure port 110, as shown in FIG. 4. In some cases, the pressure port 110 may include an indent or an indent/recess 116 (e.g., for receiving an o-ring 36, or at least part of the o-ring 36, for receiving a different type of seal, and/or for one or more other purposes). O-ring 36 may be utilized to create a good seal between the sensor unit 20 and the pressure port 110. Alternatively, the pressure port 110 may not include an indent/recess 116 and/or one or more other features may be used rather than the o-ring 36 to create a good seal between the sensor unit 20 and the pressure port 110. The o-ring 36 may form a face seal with the pressure port 110, as shown, and/or a radial seal along an outer diameter of the support 32 as desired. In addition to, or as an alternative to, utilizing the o-ring 36, a gasket, an adhesive joint, or other type of seal may be used to create a seal between the sensor unit 20 and the pressure port 110. These are just some examples.

As best shown in FIG. 4, the sensor unit 20 may include a thick film printed ceramic or a printed circuit board (PCB) 24 (e.g., a PCB made, at least in part, of FR4 laminate and/or other material), a sensor 22 (e.g., a pressure sensor with a pressure sense element, or other sensor having a sense element) connected to the PCB, a media isolation layer 38, and a support 32. The sensor 22 may be back-side mounted on a first side 24a of the PCB 24 and may be configured to perform top-side (of the sense die) sensing. In a pressure sensor, top-side sensing may be when a sensed media either directly or indirectly (e.g., through a media isolation layer or other intermediary) interacts with a top-side of a sensor 22, where a back- or bottom-side of the sensor 22 is etched inward toward the top-side to form a sensing diaphragm. The media isolation layer 38 may cover or substantially cover the sensor 22 such that media in the fluid path 34 does not directly contact the sensor 22 itself.

The support 32 may entirely, or at least partially, extend around the media isolation layer 38 and may be connected to the first side 24a of the PCB 24. Additionally, or alternatively, the support 32 may cover at least a majority of the first side 24a of the PCB 24. In some cases, the support 32 may be attached to at least a majority of the first side 24a of the PCB 24 to provide additional support that adds structural integrity to the sensor unit 20. The support 32 may be made from any type of material. In one example, the support 32 may be made from a plastic, a metal, a ceramic and/or any other suitable material.

Back-side mounting the sensor 22 to the first side 24a of the PCB 24 may facilitate creating a robust sensor unit 20, where the first side 24a (e.g., front side) may be facing the fluid path 34. In one example, back-side mounting the sensor 22 to the first side 24a of the PCB 24 may create a more robust sensor unit 20 because any sensed media acting on the sensor 22 acts to push the sensor 22 against the PCB 24. Additionally, such a configuration may allow for a smaller sensor 22 when compared to sensor units in which a sensor 22 is mounted to a second side of the PCB that faces away from the fluid path. Such a smaller sensor 22 may be possible, at least in part, because less sense element surface area is needed to attached the sensor 22 to PCB 24 when the sense element is connected to a first side 24a of the PCB 24 facing the fluid path due to forces from the fluid path 34 pushing the sense element into the PCB 24 instead of pushing the sense element away from the PCB 24.

Although the sensor 22 may be described herein as being back-side mounted to the first side 24a of the PCB 24, it is contemplated that the sensor 22 may be mounted relative to the PCB 24 in one or more other configurations. For example, the sensor 22 may be mounted to the second side 24b of the PCB 24. Also, the sensor 22 may be front side mounted, and/or the sensor 22 may be mounted in any other suitable manner.

The sensor 22 may be electrically connected to PCB 24 in any manner. In one example, the sensor 22 may be electrically connected to the PCB 24 via wire bonds, bump bonds, and/or in any other suitable manner.

When the sensor 22 is configured to sense a pressure in the fluid path 34, the sensor 22 may be arranged to sense an absolute pressure, as shown in FIG. 4, where there may be a vacuum on the back side of the sensor 22 (e.g. between the sensor 22 and the PCB 24). Alternatively, the sensor 22 may be configured in the sensor unit 20 as a gage pressure sensor, where a pressure of sensed media in the fluid path 34 is referenced against an atmospheric pressure or other reference pressure. In such a gage pressure sensor, the PCB 24 may include an opening extending through the PCB 24 (e.g., extend through the PCB 24 from the first side 24a to the second side 24b of the PCB 24) to allow a reference pressure to reach the back side of the sensor 22. Example sensors may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

The media isolation layer 38 may be any type of material configured to transfer a pressure or changes in pressure caused by a sense media in the fluid path 34 to the sensor 22, while providing a barrier between the sensor 22 and the media in the fluid path 34. In one example, the media isolation layer 38 may be a gel material layer (e.g., a non-compressible material) or other material. In the example shown, the sensor 22 and/or the media isolation layer 38 may be surrounded by the support 32. The support 32 may be connect to the PCB 24 and provide support to the PCB 24 while maintaining the media isolation layer 38 in a position over the sensor 22.

The electrical connector 120 may mechanically and/or electrically connect to the sensor unit 20. In one example, as best shown in FIG. 4, the electrical connector body 124 of the electrical connector 120 may abut the second side 24b of the PCB 24. In the example shown, the electrical connector body 124 may provide support to the PCB 24 against forces produced by the media in the fluid path 34 acting upon the sensor 22 and PCB 24. As shown in FIG. 4, the support from the electrical connector body 124 on the second side 24b of the PCB 24 may align with support on the first side 24a of the PCB 24 from the support 32 such that the PCB 24 may be sandwiched between the electrical connector body 124 and the support 32. This configuration may help support the PCB 24 and reduce stress at the sensor 22. It is contemplated that the support acting on the PCB 24 may be sufficient such that a pressure source exerting a pressure of 1, 2, 4, 8, 10, 20, 40, 50, 100, 1000, 2000, 5000 PSI or more on the sensor 22 and/or PCB 24 does not affect the accuracy of the output of the sensor assembly 10, by, for example more than 0.01 percent, 0.1 percent, 1 percent, 5 percent, 10 percent or more, as desired.

Illustratively, the support applied to the PCB 24 by the electrical connector 120 and/or the support 32 may be configured or shaped to distribute forces that may be applied to PCB 24 such that the PCB 24 may remain sufficiently flat so as to cause less than a particular percentage error in the output of sensor 22 when a pressure is applied to the sensor 22. The particular percentage error may be ten (10) percent (%) or less error in the output of sensor 22, or another desirable limit of error including, but not limited to, less than 0.001%, 0.01%, 0.1%, 1.0%, 2.0%, 5.0%, 10.0%, or 20.0%.

In the example shown, the walls 112 of the pressure port 110 may receive the electrical connector 120. An o-ring 126 may be received in and/or at the first end 124a of the electrical connector body 124 to create a seal between the electrical connector body 124 and the walls 112 of the pressure port 110. In some cases, to create a mechanical connection between the pressure port 110, the sensor unit 20, and the electrical connector 120, the walls 112 of the pressure port may be formed (e.g., bent, crimped, etc.) around the electrical connector body 124 of the electrical connector 120. Such forming of the walls 112 may compress the o-rings 36, 126 to create environmental and pneumatic seals in the sensor assembly 10.

Figure 5:
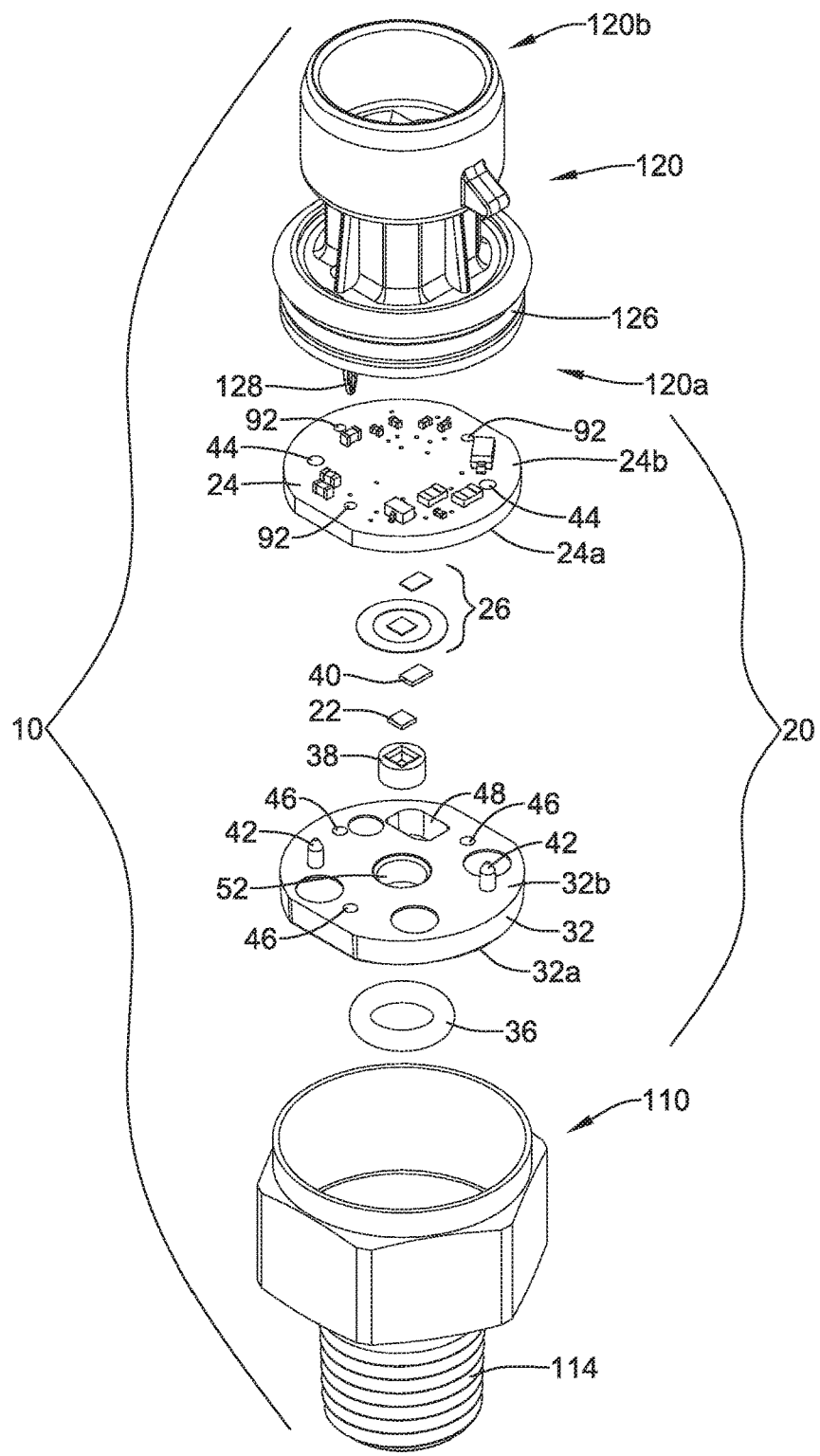
FIG. 5 is a schematic exploded perspective view of the illustrative sensor assembly of FIG. 1.

FIG. 5 is an exploded perspective view of the sensor assembly 10. As is shown in FIG. 5, the sensor 22 may include an application specific integrated circuit (ASIC) 40. The ASIC 40 may be attached to the first side 24a of the PCB 24. The ASIC 40 may be electrically connected to the PCB 24 via wire bonds, bump bonds, electrical terminals, and/or any other suitable electrical connections.

In some cases, an attach or adhesive 26 may be used to mechanically and/or electrically connect one or more of the sensor 22, the ASIC 40 and the support 32 to the first side 24a of the PCB 24. The adhesive 26 may be a single piece or layer of adhesive, or may include two or more pieces or layers of adhesive. Adhesive layer 26 may be any adhesive capable of facilitating assembly of sensor assembly 10, such as an epoxy adhesive or other similar or different adhesives. Illustrative example adhesives may include, but are not limited to, an adhesive having the ingredients of at least Bisphenol-A type epoxy resin, Diglycidyl ether of neopentyl glycol, cycloaliphatic/aliphatic amine, aluminum oxide, carbon black, and amorphous silicon dioxide; an adhesive having the ingredients of epoxy phenol novalac (25%-50% by weight), aluminum powder (10%-25% by weight), flexibilizer epoxy resin (10%-25% by weight), curing agent (2.5%-10% by weight), siloxane treated silicon dioxide (2.5%-10% by weight), silicon dioxide, chemically prepared (≤2.5% by weight), and curing agent (≤2.5% by weight); and an adhesive having the ingredients of epoxy resin (70%-90% by weight), non-volatile amide (10%-30% by weight) and amorphous silica (1%-5% by weight), or other suitable adhesives as desired.

The support 32 may include a first side 32a and a second side 32b. The second side 32b of the support 32, as shown in FIG. 5, may include one or more alignment features 42 (e.g., two pins or other number and/or type of alignment features) extending toward the PCB 24. Each alignment feature 42 may extend into and/or through an opening 44 in the PCB 24. In one example, the alignment features 42 may facilitate aligning the support 32 with the PCB such that the sensor 22 and the ASIC 40, both connected to the first side 24a of the PCB 24, may be received in corresponding openings 52, 48 in the support 32. Further, the support 32 may include one or more other indentations or recesses which may facilitate the manufacturing and/or stability of the support 32.

The PCB 24 may include one or more processing electronics and/or compensation circuitry connected to or on the second side 24b of the PCB 24, as best shown in FIG. 5. Such processing electronics may be electrically connected to the sensor 22 and/or electrical terminals 92 to process electrical signals from the sensor 22 and/or to transfer outputs from the sensor 22 to electrical terminals 122 of the electrical connector 120.

In some instances, the PCB 24 may include circuitry that may be configured to format the one or more output signals provided by the sensor 22 into a particular output format. For example, circuitry of the PCB 24 (e.g., circuitry on one or more of the first side 24a and the second side 24b of the PCB 24) may be configured to format the output signal provided by sensor 22 into a ratio-metric output format, a current format, a digital output format and/or any other suitable format. In some cases, the circuitry of the PCB 24 may be configured to regulate an output voltage. Circuitry on the PCB 24 for providing a ratio-metric (or other) output may include traces and/or other circuitry that may serve as a conduit to test pads, and/or for providing the ratio-metric (or other) output to electrical connector 120, where the circuitry does not necessary reformat the output.

In some cases, the electrical connector 120 may include one or more connectors 128 (e.g., compliant pins, solder pins (e.g., with a thick film printed ceramic or in other instances), and/or other connectors) configured to mechanically and/or electrically engage the PCB 24. Connectors 128 may be connected to the electrical connector body 124 in any manner; for example, connectors 128 may be insert molded in the electrical connector body 124. The one or more connectors 128 may include a compliant pin that may be configured to mechanically engage and electrically connect to an electrical terminal 92 of the PCB 24. Compliant pins are discussed in greater depth in U.S. Pat. No. 7,458,274, issued on Dec. 2, 2008 to Lamb et al. and titled PRESSURE SENSOR INCORPORATING A COMPLIANT PIN, which is hereby fully incorporated by reference. In instances when the electrical terminal 92 may be an opening extending through the PCB 24 from the first side 24a to the second side 24b, or an opening extending at least partially through the PCB 24, and the connectors 128 extend through the PCB 24, the support 32 may include one or more connector openings 46 that align with and may be configured to receive connectors 128 (e.g., compliant pins) extending through the PCB 24 (see FIG. 8).

Figure 6:
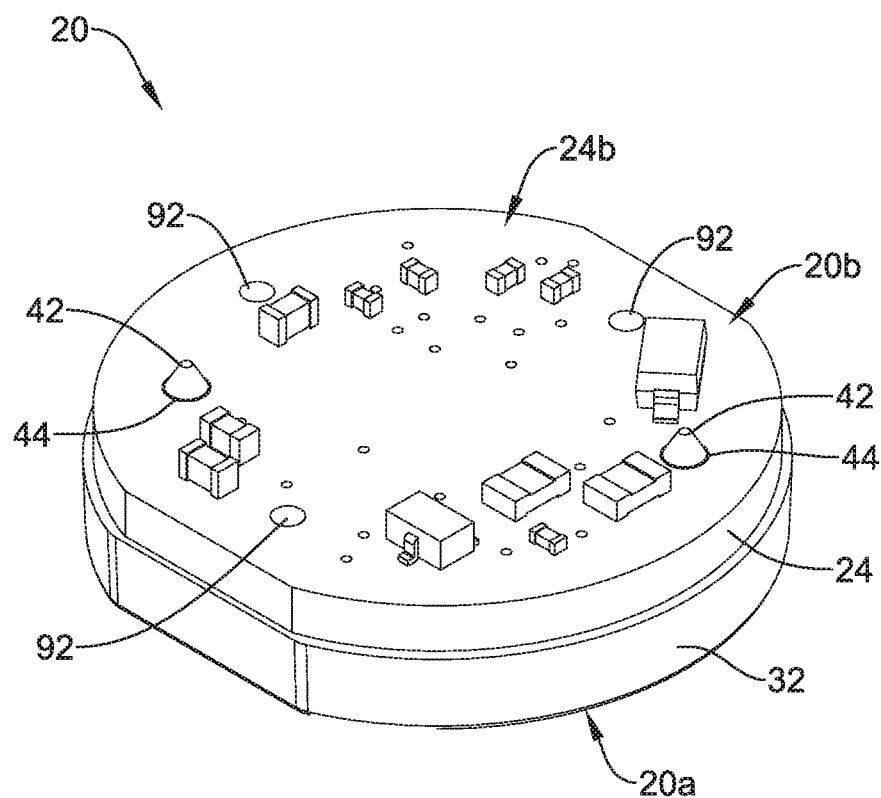
FIG. 6 is a schematic perspective view of an illustrative sensor unit.
Figure 7:
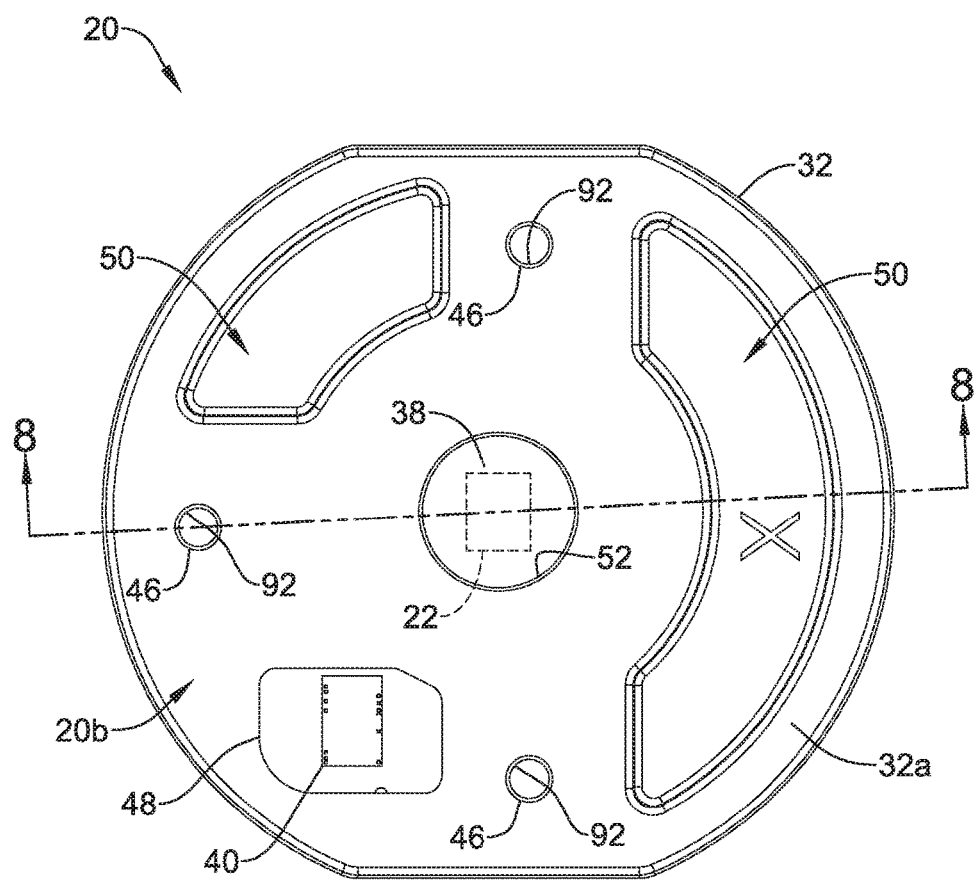
FIG. 7 is a schematic bottom side view of the illustrative sensor unit of FIG. 6.
Figure 8:
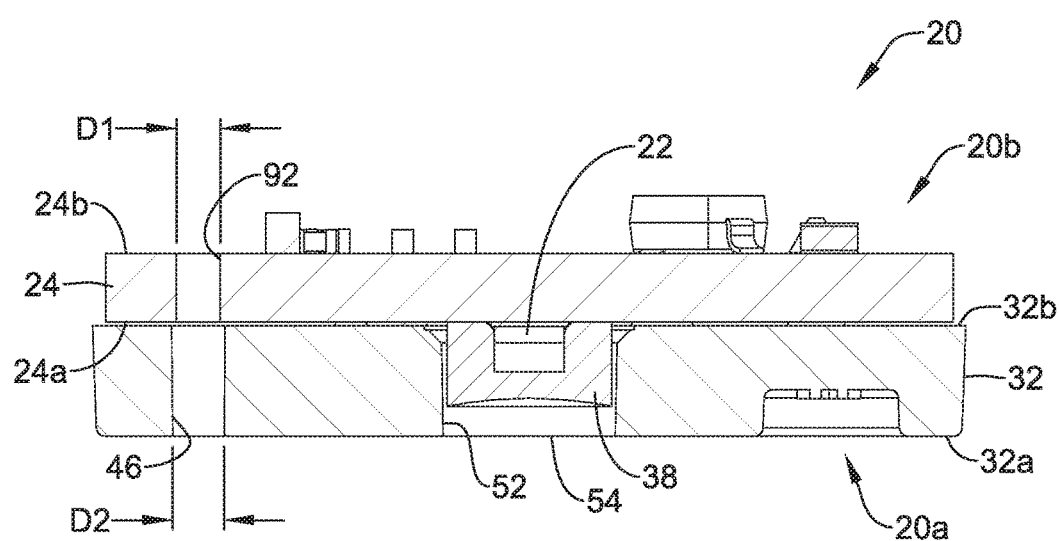
FIG. 8 is a schematic cross-sectional view of the illustrative sensor unit of FIG. 6, taken along line 8-8 in FIG. 7.

FIGS. 6-8 depict various views of the sensor unit 20. FIG. 6 is a perspective view of the sensor unit 20, showing the second side 24b of the PCB 24. As can be seen, and in some cases, when the support 32 is supporting the PCB 24, the alignment features 42 may extend into and/or through openings 44 in the PCB 24. FIG. 7 is a view of the sensor unit 20 in FIG. 6 from the first side 32a of the support 32. As can be seen from FIGS. 6 and 7, when the alignment features 42 are aligned and inserted into the openings 44 in the PCB 24, the sensor 22 connected to the first side 24a of the PCB 24 may align with the sensor opening 52. Further, the ASIC 40 connected to the first side 24a of the PCB 24 may align with the ASIC opening 48. Also, the electrical terminals 92 and associated openings of the PCB 24 may align with the connector openings 46 of the support 32. In some cases, the support 32 may include one or more structural features (e.g., indents/recesses 50) that may facilitate manufacturing, improving stability of, and/or reducing material used in the support 32. Additionally, or alternatively, the support 32, as referred to above, may define one or more other apertures, recesses, or indents configured to receive one or more other component extending from the first side 24a of the PCB 24.

FIG. 8 is a cross-section of the sensor unit 20 of FIG. 6 taken along line 8-8 in FIG. 7. FIG. 8 further depicts the alignment of openings of the electrical terminals 92 of the PCB 24 with the connector openings 46 of the support 32. The opening of the electrical terminals 92 may have a diameter D1 and the connector opening 46 of the support 32 may have a diameter D2. In some cases, the diameter D2 of the connector opening 46 may be greater than the diameter D1 of the electrical terminal 92 such that the connectors 128 may mechanically engage the opening of the electrical terminal 92, but be spaced from walls of connector opening 46. However, the relative size configuration depicted in FIG. 8 of diameter D2 with respect to D1 is not required.

Once the sensor unit 20 has been fabricated, the sensor unit 20 may be calibrated and/or compensated prior to further assembly into the sensor assembly 10. Alternatively, or in addition, the sensor unit 20 may be calibrated and/or compensated after assembly into the sensor assembly 10.

Figure 9:
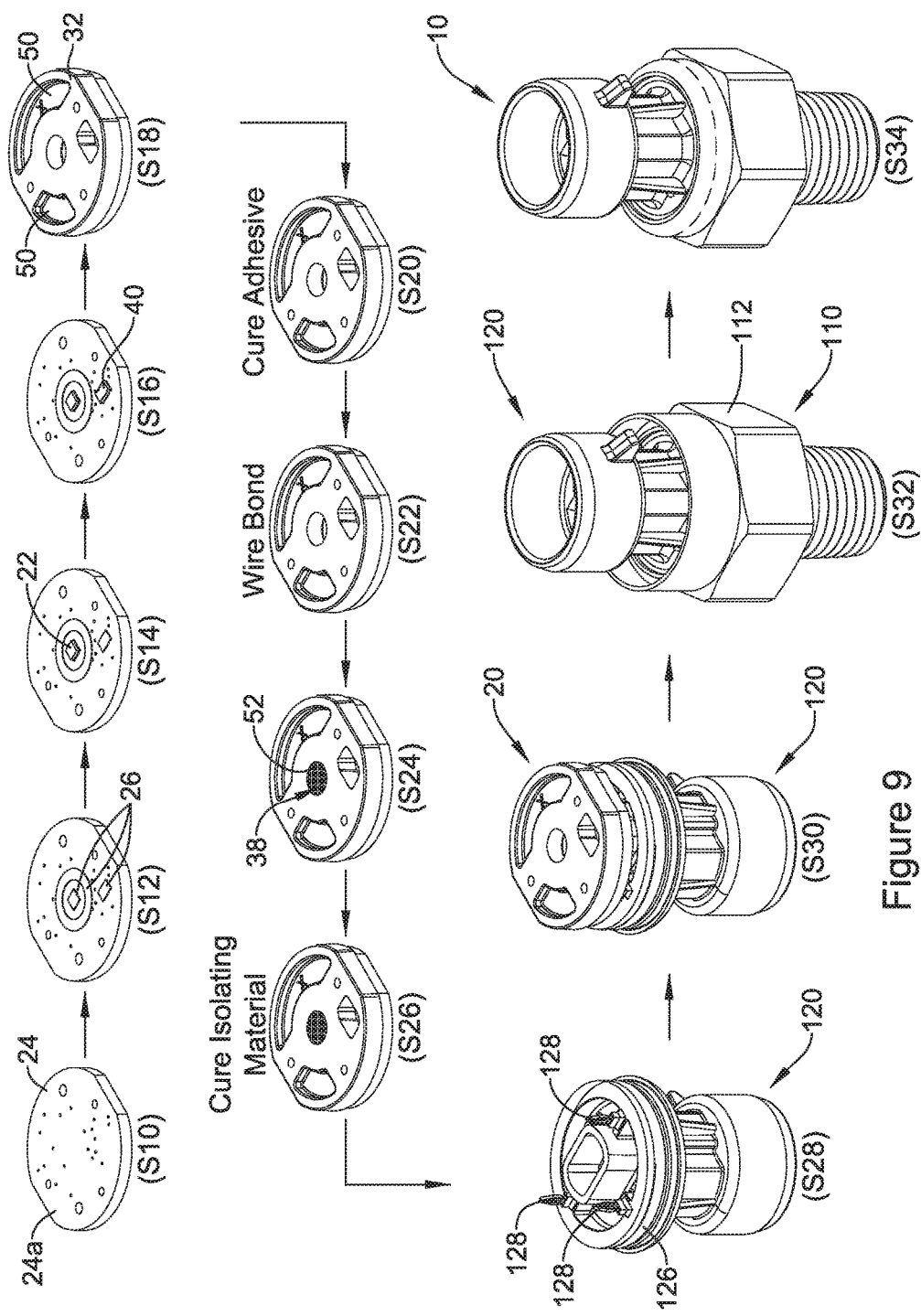
FIG. 9 is a flow diagram showing steps of an illustrative fabrication process for an illustrative sensor assembly.

The sensor assembly 10 may be assembled in one or more illustrative methods. In one example, the sensor assembly 10 may be assembled in an illustrative method as shown in FIG. 9 (note, for clarity reasons, reference numerals are included in each step only for features added in that step). It is contemplated that these steps are only illustrative, and that some additional steps may be added, some steps may be omitted, and/or some steps may be combined, as desired.

The illustrative method shown in FIG. 9 begins by providing a PCB 24 (S10). Adhesive 26 may be applied to the first side 24a of the PCB 24 (S12). The sensor 22 may be placed on an associated piece of adhesive 26 (S14), the ASIC 40 may be placed on an associated piece of adhesive 26 (S16), and the support 32 may be placed on an associated piece of adhesive 26 (S18). After placing the sensor 22, the ASIC 40, and the support 32 on the adhesive(s) 26, the adhesive(s) 26 may be cured (S20). The sensor 22, the ASIC 40, and/or other electronic components may then be wire bonded or otherwise electrically connected to the PCB 24 (S22). A media isolation layer 38 may then be applied to the sensor 22 and the PCB 24 through a media isolation opening 52 (e.g., a pressure sensor aperture) in the support 32 (S24), where the support may circumferentially or substantially circumferentially surround the sensor 22 (e.g., in such cases, the support may be a ring or a gel ring supporting the media isolation layer 38 covering the sensor 22). Once applied, the media isolation layer 38 may be cured (S26) to form the sensor unit 20. In some cases, the media isolation layer 38 may be cured by applying a vacuum and/or applying a temperature to the media isolation layer 38. In some cases, the sensor unit 20 may be calibrated over pressure at this stage, although this is not required.

The electrical connector 120 may be prepped for connection to the sensor unit 20 by loading the o-ring 126 onto the electrical connector body 124 (S28). The electrical connector 120 may be connected to the sensor unit 20 by placing the connectors 128 into openings of electrical terminals 92 of the PCB 24 to mechanically and electrically connect the electrical connector 120 to the PCB 24. The electrical connector 120 and the sensor unit 20 may then be inserted into the pressure port 110 (S32). The pressure port 110 may already have the o-ring 36 in place. Once the connected electrical connector 120 and the sensor unit 20 are inserted into the pressure port 110, the walls 112 may be formed (e.g., bent, crimped, etc.) around the electrical connector 120 to form the sensor assembly 10 (S34).

Having thus described several illustrative embodiments of the present disclosure, those of skill in the art will readily appreciate that yet other embodiments may be made and used within the scope of the claims hereto attached. It will be understood that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A pressure sensor assembly comprising:
 a sensor unit having a first side and an opposite second side with a pressure input port on the first side, the sensor unit including:
  a printed circuit board having a first side and an opposite second side, the printed circuit board having an opening that extends through the printed circuit board between the first side of the printed circuit board and the second side of the printed circuit board;
  a pressure sensor including a pressure sense element, the pressure sensor has a front side and a back side, wherein the back side faces toward and is secured to the first side of the printed circuit board;
a support secured to the first side of the printed circuit board, the support circumferentially surrounding the pressure sensor and defining a media sensing opening;
a media isolation layer encasing the front side of the pressure sensor within the media sensing opening, the media isolation layer transferring a pressure caused by a sensed media to the pressure sensor;
wherein the opening in the printed circuit board is in fluid communication with the back side of the pressure sensor;
a pressure port having a fluid path that extends from an external side of the pressure port to an internal side of the pressure port, wherein a first side of the support is secured relative to the internal side of the pressure port such that the fluid path of the pressure port is in fluid communication with the media isolation layer in the media sensing opening; and
an electrical connector including a mechanical connector and one or more electrical terminals, wherein at least one of the one or more electrical terminals of the electrical connector are electrically connected to an output of the sensor unit.

2. The pressure sensor assembly of claim 1, wherein electrical connector includes a housing and the housing of the electrical connector engages the second side of the printed circuit board.

3. The pressure sensor assembly of claim 2, wherein one or more of the one or more electrical terminals includes a compliant pin electrically and mechanically connected to the printed circuit board.

4. The pressure sensor assembly of claim 1, wherein:
the support of the sensor unit has a first side and a second side;
the first side of the support engages a shoulder of the internal side of the pressure port and the second side of the support engages the first side of the printed circuit board.

5. The pressure sensor assembly of claim 4, further comprising:
an o-ring secured between the second side of the support and the internal side of the pressure port.

6. The pressure sensor assembly of claim 5, wherein the internal side of the pressure port includes a recess for receiving at least part of the o-ring.

7. The pressure sensor assembly of claim 1, further comprising:
an Application Specific Integrated Circuit (ASIC) secured to the first side of the printed circuit board.

8. The pressure sensor assembly of claim 7, wherein the pressure sensor, the support, and the ASIC are secured to the first side of the printed circuit board with an adhesive layer.

9. The sensor of claim 1, wherein the electrical connector comprises an electrical connector body that abuts the second side of the printed circuit board, and wherein the electrical connector body supports the printed circuit board on the second side and aligns with the support on the first side of the printed circuit board to reduce stress at the pressure sensor.

10. A pressure sensor assembly comprising:
a sensor unit having a first side and an opposite second side with a pressure input port on the first side, the sensor unit including:
a printed circuit board having a first side and an opposite second side;
a pressure sensor including a pressure sense element, the pressure sensor is secured to the first side of the printed circuit board;
a support secured to the first side of the printed circuit board, the support circumferentially surrounding the pressure sensor and defining a media sensing opening;
a media isolation layer encasing the pressure sensor within the media sensing opening, the media isolation layer transferring a pressure caused by a sensed media to the pressure sensor;
a pressure port having a fluid path that extends from an external side of the pressure port to an internal side of the pressure port, wherein a first side of the support is secured relative to the internal side of the pressure port such that the fluid path of the pressure port is in fluid communication with the media isolation layer in the media sensing opening; and
an electrical connector including a mechanical connector and one or more electrical terminals, wherein at least one of the one or more electrical terminals of the electrical connector are electrically connected to an output of the sensor unit
wherein the pressure sensor is a top side sensing pressure sensor having a sensing diaphragm, wherein a back side of the sensing diaphragm defines part of a sealed chamber.

11. A sensor comprising:
a printed circuit board having a first side and a second side;
a pressure sensor having a top side and a back side, the back side of the pressure sensor is mounted to the first side of the printed circuit board, the pressure sensor including a sensing diaphragm;
a support secured to the first side of the printed circuit board, the support circumferentially surrounding the pressure sensor and defining a media sensing opening;
a media isolation layer provided within the media sensing opening and engaging the sensing diaphragm of the pressure sensor, the media isolation layer comprising an incompressible gel that transfers a pressure caused by a sensed media to the sensing diaphragm of the pressure sensor; and
wherein the support further defines at least one other opening extending to the printed circuit board that is configured to receive one or more other components attached to the first side of the printed circuit board and to fluidly isolate the received one or more other components attached to the first side of the printed circuit board from the media sensing opening.

12. The sensor of claim 11, wherein the support is a gel ring.

13. The sensor of claim 11, wherein the one or more other components comprises an Application Specific Integrated Circuit (ASIC) secured to the first side of the printed circuit board.

14. The sensor of claim 13, wherein the pressure sensor, the support, and the ASIC are attached to the printed circuit board with a layer of adhesive.

15. The sensor of claim 13, wherein the support includes two or more alignment features that are configured to engage two or more alignment features of the printed circuit board to align the support to the printed circuit board.

16. The sensor of claim 11, wherein a sealed chamber is located between the back side of the pressure sensor and the first side of the printed circuit board.

17. The sensor of claim 11, further comprising:
an opening extending between the first side of the printed circuit board and the second side of the printed circuit board, wherein the opening is in fluid communication with a chamber defined between the back side of the pressure sensor and the first side of the printed circuit board.

\* \* \* \* \*